Oct. 7, 1952 R. L. FOWLER 2,612,691
ELLIPSOGRAPH
Filed Feb. 18, 1952 2 SHEETS—SHEET 1

RALPH L. FOWLER,
INVENTOR.

BY Hazard & Miller

ATTORNEYS

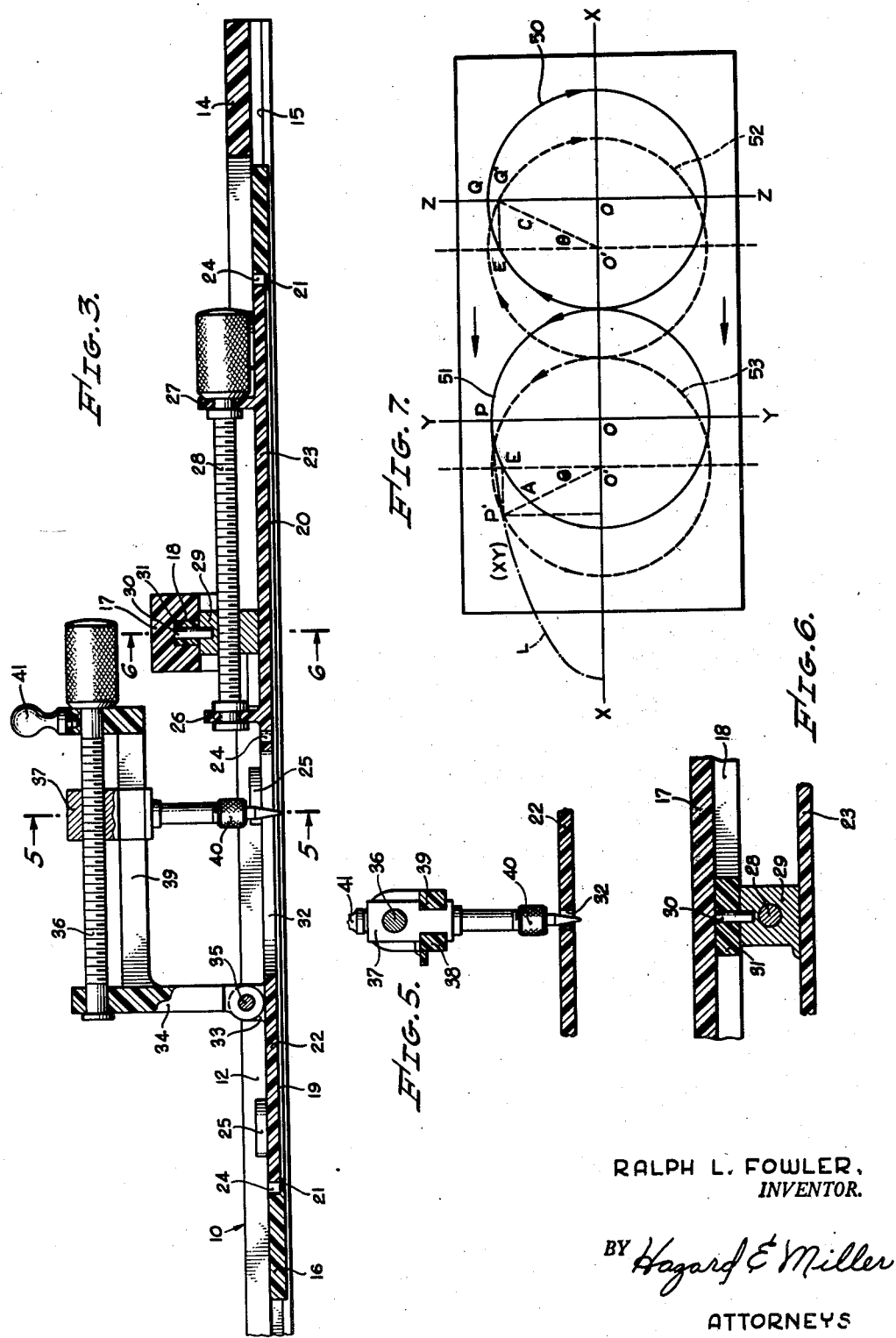

Patented Oct. 7, 1952

2,612,691

UNITED STATES PATENT OFFICE 2,612,691

ELLIPSOGRAPH

Ralph L. Fowler, Whittier, Calif.

Application February 18, 1952, Serial No. 272,193

3 Claims. (Cl. 33—31)

This invention relates to improvements in ellipsographs.

An object of the invention is to provide a device that may be used to accurately draw or cut true ellipses which is highly advantageous in that the construction is relatively simple having comparatively few moving parts and which may be easily and quickly adjusted to draw an accurate ellipse with respect to the center of the ellipse, the major and minor axes of the ellipse being either assumed or known.

Another object of the invention is to provide an ellipsograph which is adjustable so that any size of ellipse from virtually a point to the maximum size of the instrument can be easily and accurately drawn.

With the foregoing and other objects in view, which will be made manifest in the following detailed description and specifically pointed out in the appended claims, reference is had to the accompanying drawings for an illustrative embodiment of the invention, wherein:

Fig. 3 is a vertical section taken substantially upon the line 3—3 upon Fig. 2;

Fig. 5 is a vertical section taken substantially upon the line 5—5 upon Fig. 3;

Fig. 6 is a partial vertical section taken substantially upon the line 6—6 upon Fig. 3; and Fig. 7 is a diagram to illustrate a methematical proof of the accuracy of the improved ellipsograph.

Figure 1:
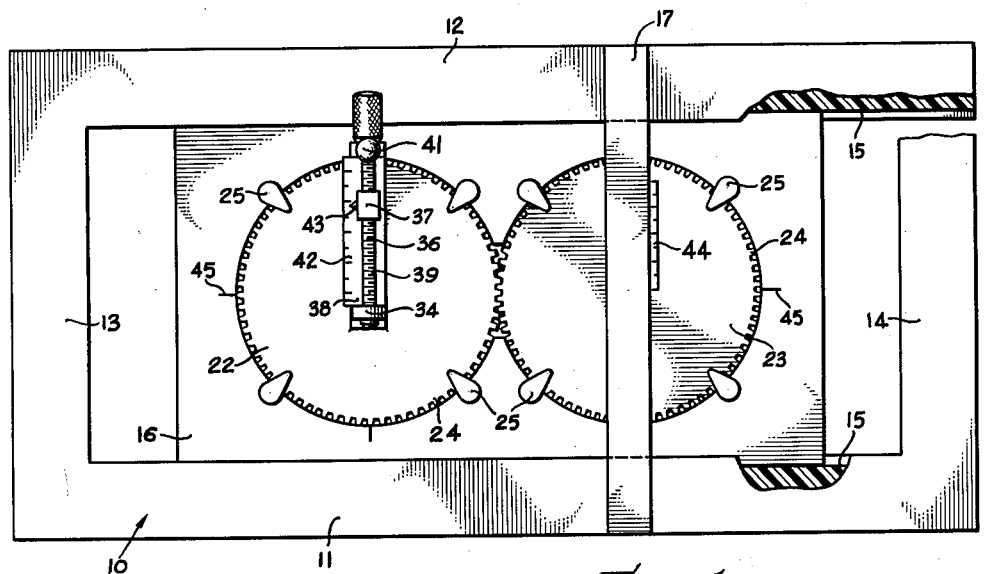
Figure 1 is a top plan view of the ellipsograph embodying the present invention, parts being broken away and shown in horizontal section, the ellipsograph being shown in that position wherein it is being adjusted for the minor axis of the ellipse.

Referring to the accompanying drawings wherein similar reference characters designate similar parts throughout, the improved ellipsograph comprises a rectangular base generally indicated at 10 having opposed sides 11 and 12 connected by ends 13 and 14. The opposed faces of the sides 11 and 12 are grooved as indicated at 15 so as to slidingly receive the side edges of a rectangular slide 16. The ends 13 and 14 are disposed above the tops of the grooves 15 as clearly shown in Fig. 3 so that the ends will not interfere with the sliding movement of the slide 16 but will permit the ends of the slide 16 to pass therebeneath if occasion requires. The grooves 15 which slidingly receive the side edges of the slide 16 constitute one guide means on the base 10. A second guide means on the base is arranged at right angles thereto and is provided by a stationary bridging crosshead 17 that extends across the base over the slide 16 and has a groove 18 formed on its under side.

Within the slide 16 two tangentially arranged circular openings are provided indicated at 19 and 20. These openings are preferably flanged as indicated at 21, the flanges serving to slidably support two rotors 22 and 23. The two rotors 22 and 23 are preferably in the form of equal-sized gears having gear teeth 24 which mesh with each other at the point of tangency so that when one rotor, such as the rotor 22, is forcibly rotated relatively to the slide 16 the other or driven rotor 23 will be driven and caused to rotate at the same rate and in the opposite direction. The two rotors 22 and 23 are confined or retained on their flanges 21 in their respective openings by means of retainers 25. On the rotor 23 there are supports 26 and 27 for rotatably supporting an adjusting screw 28. This adjusting screw is provided with an adjustable nut 29 carrying an upstanding pin 30 that rotatably extends into a slide 31 that is slidable in the groove 18 of the stationary crosshead 17. The rotor 22 has a radially extending slot 32 formed that extends from one side of the center of this rotor to a point adjacent its periphery. Hinge knuckles 33 are provided on the rotor 22 so that a stylus supporting arm 34 may be hingedly mounted thereon, such as by a hinge pin 35. The arm 34 serves to rotatably support an adjusting screw 36 which is threaded through a nut 37 that is slidable between spaced guides 38 and 39 provided by the arm. The nut 37 carries a stylus 40 that extends downwardly through the slot 32 when the arm 34 is in the position shown in Fig. 3. The stylus may be merely a pencil lead, a pen, a steel scribe, or it may even be a cutter, such as for example an oxy-acetylene cutting torch. The hinge connection afforded by the hinge pin 35 enables the arm 34 to be swung into a position wherein the stylus, whatever its form may be, can be adjusted or replaced. Preferably, the arm 34 carries a suitable knob or handle 41 by which the rotor 22 can be rotated about its center relatively to the slide 16. If desired, the arm 34 may be equipped with graduations 42 arranged to be traversed by a pointer 43 on the nut 37 so that the distance that the stylus is from the center of the rotor 22 can be read or ascertained therefrom. In a similar manner, the rotor 23 may be equipped with graduations 44 so that the distance that the pin 30 is from the center of the rotor 23 can be ascertained therefrom.

It will be appreciated that motion of the slide 16 relative to the base 10 is limited to linear motion afforded by the guide grooves 15. This linear motion is produced by rotating the rotor 22 by means of the knob 41 relative to the slide 16 which, in turn, causes the rotor 23 to rotate at the same rate and in the opposite direction. Rotation of the rotor 23 produces rotation of the pin 30 about the center of the rotor 23 and produces transverse movement of the slide 31 relative to the crosshead 17. When such motion takes place, if the stylus 40 is in contact with any reasonably flat surface it will draw a true ellipse thereon.

In order to adjust the ellipsograph to meet different conditions the center of the rotor 22 is first positioned over the center of the ellipse to be drawn with the length of the arm 34 arranged parallel to the crosshead 17. To facilitate such positioning the slide may be provided with suitable marks indicated at 45 which will assist in sighting the center of the rotor to position it over the center of the ellipse. The major parts of the ellipsograph, including the base 10, the slide 16, and the two rotors, are preferably formed of a transparent material, such as a synthetic resin plastic so that the surface on which the ellipse is to be drawn may be seen therethrough.

Figure 2:
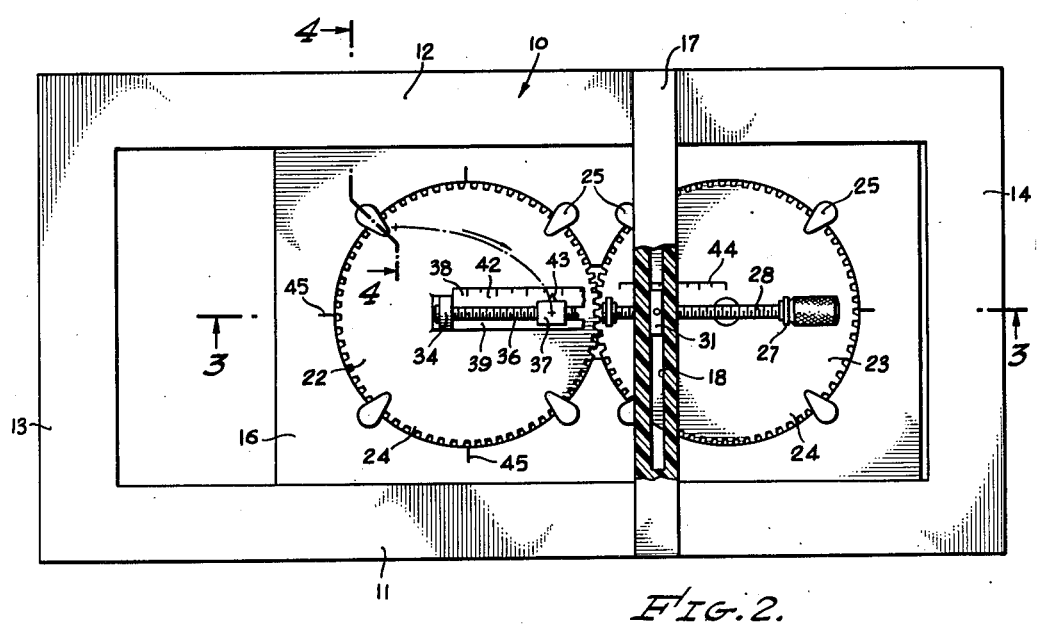
Fig. 2 is a view similar to Fig. 1, the parts being shown wherein the instrument may be adjusted for the major axis of the ellipse.
Figure 4:
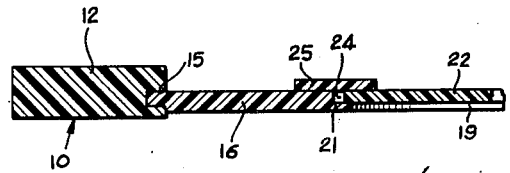
Fig. 4 is a partial view in vertical section taken substantially upon the line 4—4 upon Fig. 2.

When the center of the rotor 22 has been positioned over the center of the ellipse as illustrated in Fig. 1, the adjusting screw 36 is adjusted so as to space the stylus 40 from the center a distance equal to one-half the length of the minor axis of the ellipse. When the stylus has been so adjusted the rotor 22 is rotated through 90° or into the position shown in Fig. 2, and the adjusting screw 28 is adjusted so that the stylus 40 overlies one end of the major axis of the ellipse. When the ellipsograph has been thus adjusted one complete revolution of the rotor 22 will cause the scribing of one complete accurate ellipse. The motion imparted to the stylus is a combination of rotary and linear motion produced by the connection between the rotor 23 and the crosshead 17 and the guiding of the slide 16 by the sides 11 and 12 of the base 10.

Adjustment of the stylus 40 toward the center of the rotor 22 is unlimited. In other words, the stylus 40 may be positioned at or very close to the center of the rotor 22. In a similar manner, the center of the pin 30 may be positioned over or very close to the center of the rotor 23. Consequently, the improved ellipsograph can be employed to scribe very small ellipses and the maximum size of the ellipse is limited only by the length of the slot 32.

To mathematically prove that the path traversed by the stylus 40 is that of a true ellipse, reference is made to Fig. 7 wherein the peripheries of the two rotors 22 and 23 are represented by the two full-line circles 50 and 51 which are tangent to each other along the X coordinate X—X. These circles are indicated as being of the same diameter and rotating at the same speeds but in opposite directions. On the circle 50 which represents the rotor 23 there is a point Q corresponding to the axis of the pin 30, the movement of which is restricted to movement along the line Z—Z in the same manner that the pin 30 has its movement restricted by means of the stationary crosshead 17. As the circle 50 rotates the point Q in descending to the point Q' along the line Z—Z causes the center O of the circle 50 to shift from O to O' and simultaneously the center of the circle 51 will be caused to shift from its initial center O to O'. The shifted positions of the two circles are indicated by the dotted line circles 52 and 53, respectively. During the shift of the point Q to Q', circle 50 will rotate through an angle $\theta$ and during the shift or rotation of the circle 50 through angle $\theta$ circle 51 will likewise rotate through the same angle $\theta$. The point Q' is assumed to be at a radius C from the center O' and the point P' on the circle 53 is assumed at a radius A from its center O'. The problem then is to find the equation traced by the point P. In proceeding through the point P' on the curve L, the position of the point P is to be determined with respect to the original center O and with respect to the original coordinate Y—Y and X—X. The angle $\theta$ is the parameter. As the rotor 23 is restricted by the slide 16 to movement only along the X—X coordinate the Y position of point P' is:

$$Y = EO' = O'P' \cos \theta = A \cos \theta$$

The distance that point P moves along the X—X axis while rotating through angle $\theta$ is:

$$X = EP' + OO'$$
$$OO' = EQ'$$

then $$X = C \sin \theta + EP'$$

or $$X = A \sin \theta + C \sin \theta$$
$$X = \sin \theta (A + C)$$

The radii C and A are constants and consequently the sum of these radii equals a new constant which may be represented by B. Substituting B for the sum C plus A, $$X = B \sin \theta \text{ and } Y = A \cos \theta$$

These are parametric equations of the locus of the path traversed by the point P to P'.

$$\sin \theta = \frac{X}{B}$$

$$\cos \theta = \frac{Y}{A}$$

Squaring and adding $$\frac{X^2}{B^2} + \frac{Y^2}{A^2} = \cos^2 \theta + \sin^2 \theta$$

or $$\frac{X^2}{B^2} + \frac{Y^2}{A^2} = 1$$

This equation is the equation of a true ellipse. Consequently, regardless of the length of radius A to the point represented by P' which corresponds to the distance that the stylus 40 is from the center of the rotor 22 and regardless of the length of radius C which corresponds to the distance that the pin 30 is from the center of rotor 23, the point P will be caused to traverse the path of a true ellipse.

From the above-described construction it will be appreciated that an improved ellipsograph is provided which is relatively simple in construction and which will scribe a true ellipse. The arrangement of parts is such that if the center of the proposed ellipse is known and the length of its major and minor axis is also known that the ellipsograph can be easily and quickly adjusted with respect to these known factors and then be caused to scribe a true ellipse. The arrangement is also such that the device can be used to draw very small ellipses where occasion so requires in that the radial distance of the stylus 40 from the center of its rotor 22 can be very small and likewise the radial distance of the pin 30 from the center of the rotor 23 can be very small. In fact, the instrument can be used to draw ellipses from 0° to 90°, that is from a straight line, when the minor axis is of no appreciable length, to a full circle which is the situation when the minor axis and the major axis are equal.

Various changes may be made in the details of construction without departing from the spirit and scope of the invention as defined by the appended claims.

I claim:

1. An ellipsograph comprising a base, a slide slidably mounted thereon for sliding movement in a straight lateral direction, a pair of equal sized tangentially arranged rotors rotatably mounted on the slide having mutually engaged peripheral teeth for causing the rotors to rotate in unison but in opposite directions, a crosshead extending across the base at right angles to the direction of sliding movement of the slide, a slide on the crosshead, means connecting one of the rotors to the slide on the crosshead, a slot in the other rotor, and a stylus mounted on said other rotor extending through the slot.

2. An ellipsograph comprising a base, a slide slidably mounted thereon for sliding movement in a straight lateral direction, a pair of equal sized tangentially arranged rotors rotatably mounted on the slide having mutually engaged peripheral teeth for causing the rotors to rotate in unison but in opposite directions, a crosshead extending across the base at right angles to the direction of sliding movement of the slide, a slide on the crosshead, means connecting one of the rotors to the slide on the crosshead, a slot in the other rotor, and a stylus mounted on said other rotor extending through the slot, the connecting means between said one of the rotors and the slide on the crosshead being adjustable as to length to vary the distance between the slide on the crosshead and the center of said one of the rotors, and the mounting means for the stylus on said other rotor being adjustable so as to radially vary the position of the stylus from the center of said other rotor.

3. An ellipsograph comprising a base, a slide slidably mounted thereon for sliding movement in a lateral direction, there being a pair of tangentially arranged openings in the slide, rotors rotatably mounted in said openings, said rotors being of equal size and having peripheral teeth in mutual engagement causing the rotors to rotate in unison but in opposite directions, a crosshead extending across the base at right angles to the direction of sliding movement of the slide, a slide on the crosshead, means connecting one of the rotors to the slide on the crosshead to vary the position of the center of the mentioned rotor with respect to the slide on the crosshead, a radial slot in the other rotor, and a stylus adjustably mounted on said other rotor for radial adjustment with respect to said other rotor and extending through the slot.

RALPH L. FOWLER.

REFERENCES CITED

The following references are of record in the file of this patent:

UNITED STATES PATENTS

| Number | Name | Date |
|---|---|---|
| 1,876,069 | O'Byrne | Sept. 6, 1932 |
| 2,595,417 | Scott | May 6, 1952 |

FOREIGN PATENTS

| Number | Country | Date |
|---|---|---|
| 360,248 | Germany | Sept. 30, 1922 |
| 636,233 | Germany | Oct. 5, 1936 |